United States Patent
Ufongene

(10) Patent No.: US 6,393,290 B1
(45) Date of Patent: May 21, 2002

(54) COST BASED MODEL FOR WIRELESS ARCHITECTURE

(75) Inventor: Charles M. Ufongene, Pine Brook, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/343,556

(22) Filed: Jun. 30, 1999

(51) Int. Cl.$^7$ ................................................ H04Q 7/20
(52) U.S. Cl. ...................................... 455/446; 455/67.7
(58) Field of Search ............................... 455/422, 446, 455/449, 67.1, 67.6, 447, 67.7

(56) References Cited

U.S. PATENT DOCUMENTS

| | | | |
|---|---|---|---|
| 5,058,200 A | * 10/1991 | Huang et al. | 455/33 |
| 5,293,640 A | * 3/1994 | Gunmar et al. | 455/33.1 |
| 5,828,961 A | * 10/1998 | Subramamian | 455/446 |
| 5,926,762 A | * 7/1999 | Arpee et al. | 455/447 |
| 6,032,105 A | * 2/2000 | Lee et al. | 702/57 |
| 6,094,580 A | * 7/2000 | Yu et al. | 455/446 |
| 6,141,557 A | * 10/2000 | Dipiazza | 455/446 |

* cited by examiner

Primary Examiner—Edward F. Urban
Assistant Examiner—Naghmeh Mehrpour
(74) Attorney, Agent, or Firm—Birch Stewart Kolasch & Birch

(57) ABSTRACT

A cost modeling technique derives node, link, and end-to-end costs for a communication network design as a function of radio frequency, demographic, traffic, system, and marketing variables, thereby enabling a comprehensive characterization of network cost in terms of these factors. A cost-sensitivity analysis tool allows a user to vary network parameters, track the impact of such variables on network node, link, and end-to-end cost; and recognize the variation of cost as a function of different input variables, thus facilitating design. One implementation models a fixed wireless access network, providing a cost estimate for provisioning service bandwidth to buildings of a service area which is divided into a number of cells. The size of each cell is defined as the minimum of radio range—a function of the modulation scheme implemented by the base station transmitter; rain radius—a function of rain zone, rain availability requirements, signal polarization, and receiving antenna gain; and hub capacity radius—a function of allocated bandwidth per cell, spectral efficiency, service bandwidth requirements, building density, and penetration rates. The cost of the feeder network and end-to-end network cost is considered as a function of cell size to indicate the effect of input variables which constrain cell size on end-to-end network cost.

23 Claims, 7 Drawing Sheets

ORTHOGONAL FEEDER PATHS. OPTICAL CABLES CARRY $N_{sec}$ x OC-N SIGNALS TO EACH HUB

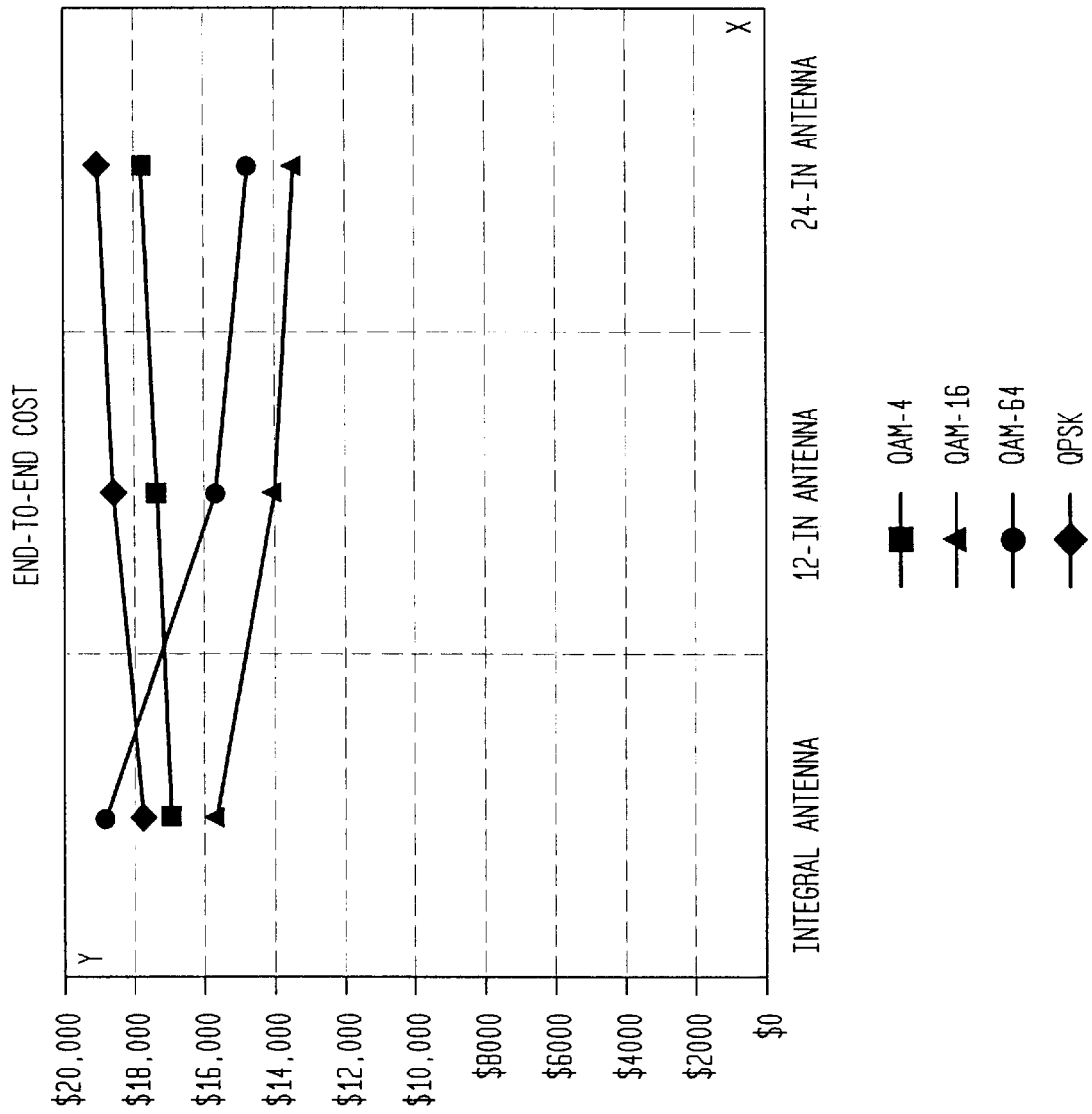

COST BASED MODEL FOR WIRELESS ARCHITECTURE

BACKGROUND OF THE INVENTION

1. Field of the Invention

The present invention relates to the field of communication networks, and more particularly to a cost modeling technique for communication network architectures.

2. Description of Related Art

Many access architectures/topologies are possible for providing subscribers broadband service, including all fiber networks, hybrid fiber/copper networks, DSL (Digital Subscriber Line) broadband networks, wireless networks, and fixed wireless access networks (e.g., hybrid fiber/wireless networks). Numerous factors impact the relative cost of implementing such architectures to varying degrees, including: (1) the type of services offered (e.g., voice, data and/or video) and the bit rates associated with such service types; (2) the network architecture deployed (e.g., wire line, fiber, wireless or hybrid architectures); (3) the service area characteristics, such as service area size, subscriber densities, and service penetration rates; (4) infrastructure and labor costs; and (5) access charges.

Despite substantial bandwidth capacity, all fiber access is generally not a cost-effective option, and, thus, only a small fraction of commercial buildings are served by all fiber access networks. Broadband service may instead be provided by upgrading existing copper facilities using DSL technology. Range limitations of DSL technology, however, require that service providers deploy substantially more DLCs (digital loop carriers) over long loops, or install higher-gauge cables in their networks. Moreover, because of loaded cables and ill-conditioned pairs which are-often encountered in older cables, and which can become noisy at the operational frequency of the DSL, even when within range, not all customers can be adequately served by DSL technology.

Consequently, fixed wireless access networks have emerged as an alternative to all fiber and DSL designs. Worldwide, spectrums for broadband wireless access are being allocated at frequencies from 10 GHz to 42 GHz. Compared to point-to-point implementations, point-to-multipoint millimeter-wave technology, such as LMDS (Local Multipoint Distribution Service), allows one base station to communicate with many customers, thereby reducing the number of base stations required in the network, and, thus, reducing costs. Some of the benefits offered by fixed wireless access include speed of deployment, faster realization of revenue as a result of faster deployment, and lower network maintenance, management, and operating expenses.

Certain factors, however, limit the applicability of fixed wireless access networks. Specifically, rainfall causes signal depolarization of the microwave frequencies allocated for broadband wireless networks, thereby decreasing signal levels and interference isolation between adjacent cell sectors. Also, at millimeter-wave frequencies, communication is line-of-sight (LOS) dependent. Thus, topography and obstructions may prevent some customers within a cell from receiving adequate signal levels. Microwave frequencies are also heavily attenuated by foliage, a fact that has practically eliminated LMDS and other millimeter-wave access technologies for broadband delivery in suburban residential environments. Despite these factors, certain market segments, such as business complexes, may be suitable for fixed wireless access.

Given the various architectures/topologies which are possible for broadband service deliver, and the wide variety of network design options, the need exists for a cost modeling tool which enables a user to recognize the impact of input variables on network node, link, and end-to-end costs.

SUMMARY OF THE INVENTION

The present invention is a technique for modeling costs of communication network architectures. Cost models are derived for the network nodes, links, and end-to-end as a function of RF (radio frequency), demographic, traffic, system, and marketing input variables, thereby enabling a comprehensive characterization of network cost in terms of these factors.

In one embodiment, the present invention is an interactive cost-sensitivity analysis tool which allows a user, such as a network designer, to vary network parameters and track the impact of such variables on network node, link, and end-to-end cost. Such cost-sensitivity analysis enables the user to recognize the variation of cost as a function of different input variables, thus facilitating network design and optimization.

In one implementation, the present invention models costs for a fixed wireless access network, providing a cost estimate for provisioning a given service bandwidth to buildings of a service area which is divided into a number of contiguous cells, each served by at least one base station. Demographic parameters, such as serving area size and building density; marketing parameters, such as service penetration rates, i.e., the percentage of potential customers expected to be served; traffic parameters, such as service bandwidth delivered per building; system parameters, such as rain availability requirements, modulation scheme, antenna gain, and hub capacity; and component costs are considered. The size of each cell is determined by taking the minimum of three constraining radii to ensure that both capacity and coverage requirements of the network are satisfied. More specifically, the minimum of: (1) radio range—a function of the modulation scheme implemented by the base station transmitter; (2) rain radius—a function of the geographic rain zone, rain availability requirements, signal polarization, and receiving antenna gain; and (3) hub capacity radius—a function of allocated bandwidth per cell, spectral efficiency, service bandwidth requirements, building density, and penetration rates, is determined.

The cost model estimates lengths/cost of the feeder network, i.e., the backhaul network connecting each hub to a service node, as a function of the previously determined cell size. Thus, the impact on the feeder network and end-to-end network cost of input variables, such as modulation scheme, antenna-type, bandwidth demand, penetration rates, rain availability requirements, and rain zone, can be recognized by considering total cost as a function of cell size, thereby facilitating cost-efficient network design.

BRIEF DESCRIPTION OF THE DRAWINGS

Other aspects and advantages of the present invention will become apparent upon reading the following detailed description and upon reference to the drawings, in which:

FIGS. 7A–B illustrate exemplary cost-sensitivity analysis plots using cost modeling results generated in accordance with the present invention.

DETAILED DESCRIPTION

The present invention is a technique for modeling node, link, and end-to-end costs of access network architectures. As discussed in detail below, the present invention may be implemented as an interactive cost-sensitivity analysis tool which allows a user, such as a network designer, to recognize the effect of input variables on network node, link, and end-to-end cost.

Figure 1:
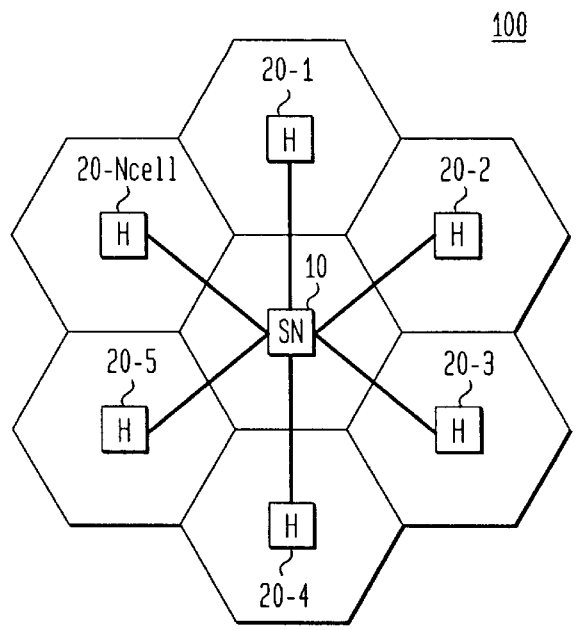
FIG. 1 illustrates an exemplary fixed wireless network service network configuration, which may be cost modeled in accordance with an embodiment of the present invention.

Referring now to FIG. 1, there is shown an exemplary fixed wireless access network 100 which may be cost modeled in accordance with principles of the present invention. The access network 100 provides various communication services, such as voice, data and/or video, to subscribers in a geographical service area that is divided into a plurality of contiguous hexagonal cells. Each cell has a corresponding base station ("Hub") 20-1, . . . , 20-$N_{cell}$ for providing buildings in the cell with access to services offered by a Service Node (SN) 10. The Hubs 20-1, . . . , 20-$N_{cell}$ are each connected to the SN 10 by a leased or built-out feeder network. Many variations on the access network 100 illustrated in FIG. 1 are possible. For example, each of the contiguous cells may be divided into a plurality of sectors ($N_{sec}$). Additionally, although the cells are shown as hexagonal areas, different area shapes, such as a square, are possible.

The region served by the SN 10 has an area, $A_{co}$, and contains a number of buildings, $B_n$, thereby yielding a building density, $D_b$, of $B_n/A_{co}$. Although in practice buildings will contain different numbers of users and be non-uniformly distributed over the serving area, it can be assumed for modeling purposes that: (1) buildings are uniformly distributed over the serving area; and (2) all buildings have the same service bandwidth requirements.

Figure 2:
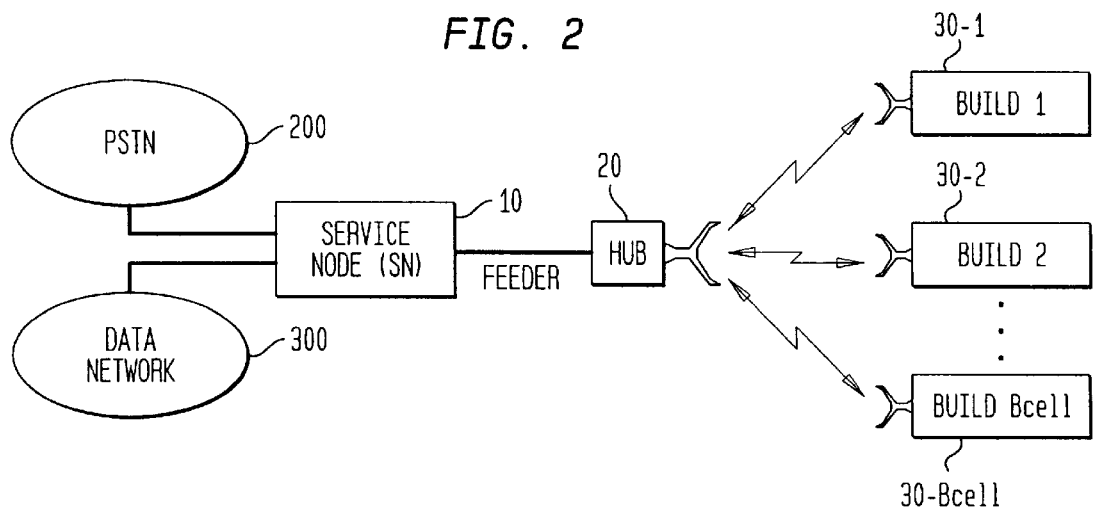
FIG. 2 illustrates an exemplary point-to-multipoint wireless access architecture which may be cost-modeled in accordance with an embodiment of the present invention.

FIG. 2 illustrates an exemplary fixed wireless access network topology in which a Hub 20 serves a number, $B_{cell}$, of buildings 30-1, 30-2, . . . , 30-$B_{cell}$. The Hub 20 is connected to the SN 10 via a feeder line. The SN 10 acts as an interface between the Hub 20 and a PSTN (Public Switched Telephone Network) 200 and a data network 300. The Hub 20 provides service bandwidth, which can be expressed as a number, T1$_b$, of T1/DS-1 trunks (one T1s/DS-1 trunk equaling 1.544 Mbps) or a number, n, of DSO trunks (one DSO equaling 64 kbps) per building. As shown in FIG. 2, the end-to-end cost model for the fixed wireless access architecture includes four additive segments: (1) a Hub cost segment; (2) a feeder loop cost segment; (3) an end user node (EUN) cost segment and (4) an SN cost segment.

The total fixed wireless access cost (per building), $C_{fn}$, can therefore be represented as:

$$C_{fn} = C_{fs} + C_{ff} + C_{fhub} + C_{fb}, \quad (1)$$

where $C_{fs}$ is the service node cost, $C_{ff}$ is the feeder loop cost, $C_{fhub}$ is the Hub cost, and $C_{fb}$ is the EUN cost. Cost modeling for each of these additive components is discussed in detail below.

The Hub Cost Model

The Hub cost per building, $C_{fhub}$, can be generally represented as:

$$C_{fhub} = \frac{C_{hub}}{B_{cell}} \quad \text{where,} \quad (2)$$

$C_{hub}$: the cost of the Hub, and $B_{cell}$: number of buildings per cell

Figure 3:
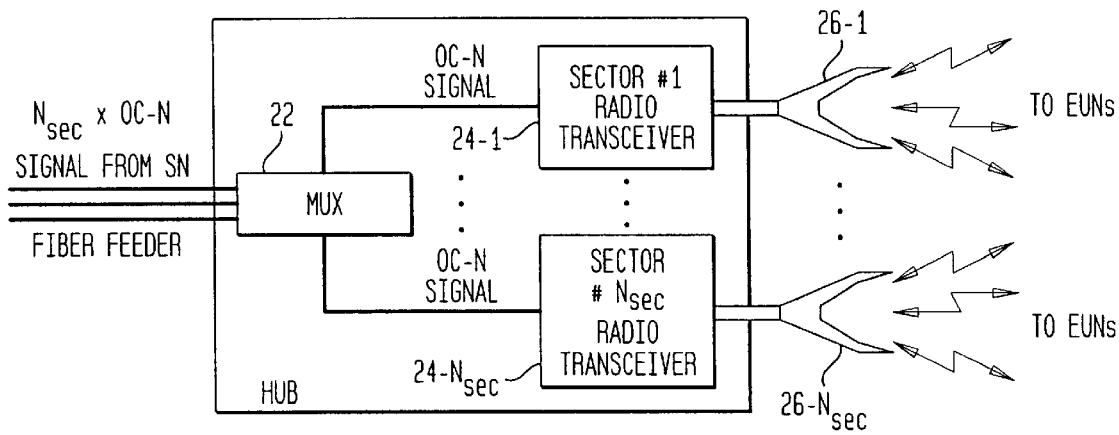
FIG. 3 illustrates an exemplary Hub architecture which may be cost-modeled in accordance with an embodiment of the present invention.

As shown for example in FIG. 3, the cost of a single Hub 20 includes the cost of a multiplexer 22, which is connected to the SN 10 via a feeder line providing a certain bandwidth capacity. For ease of illustration, it can be assumed that the feeder line is a fiber feeder providing a capacity of $N_{sec} \times$ OC-N (Optical Carrier of level-N, where N is equivalent bit rate per sector, and OC-1 carries 51.84 Mbps), where $N_{sec}$ is the number of sectors included at the Hub 20. The cost of the Hub 20 also includes the cost of a number of radio transceivers 24-1, . . . , 24-$N_{sec}$ and corresponding antennas 26-1, . . . , 26-$N_{sec}$. The required capacity of the multiplexer is $N_{sec} \times$ OC-N, and:

$$C_{hub} = C_{mux} + C_{sr}N_{sec} \quad (3)$$

where,

| | |
|---|---|
| $C_{mux}$ | : cost of the Hub multiplexer |
| $C_{sr}$ | : cost of radio (transceiver + antenna) per sector |
| $N_{sec}$ | : Number of sectors per cell |

Substituting equation (3) into equation (2), $$C_{fhub} = \frac{C_{mux} + C_{sr}N_{sec}}{B_{cell}} \quad (4)$$

Hub capacity, i.e., the service bandwidth a Hub is able to provide, is quantified as a function of the licensed bandwidth per sector and the spectral efficiency of the modulation technique utilized at the Hub. Specifically, Hub capacity, $H_{cap}$, is obtained from:

$$H_{cap}(Mb/s) = B_{sec}N_{sec}S_{eff} \quad (5)$$

where, $H_{cap}$: Hub capacity $B_{sec}$: Bandwidth per Sector (MHz)

$S_{eff}$: Spectral Efficiency of Modulation Scheme (bits/s/Hz)

Hub capacity can be represented in terms of (OC-N) capacity as:

$$H_{cap}(OC-N) = \frac{B_{sec}N_{sec}S_{eff}}{51.84N} \quad (6)$$

$N$: is 1,3, ... in OC-N

The number of T1s in OC-N is 28N T1s. Therefore, the equivalent number of T1s in $H_{cap}$ from equation (6) is:

$$H_{cap}(T1s) = \frac{28 B_{sec} N_{sec} S_{eff}}{51.84} = 0.54 B_{sec} N_{sec} S_{eff} \text{ for } T1 \text{ access} \quad (7)$$

The number of DS0s in OC-N is 672N DS0s. Therefore, the equivalent number of DS0s in $H_{cap}$ from equation (6) is:

$$H_{cap}(nxDS0) = \frac{672 B_{sec} N_{sec} S_{eff}}{51.84} = 12.96 B_{sec} N_{sec} S_{eff} \quad (8)$$

for $nxDS0$ access

Also, the Hub capacity may be expressed geographically in terms of the hub radius $R_{hub}$, which is a function of the serving area demographics, including building density $D_b$ and penetration rates δ, and the bandwidth per building, $T1_b$. More specifically, to quantify Hub capacity as a geographic region, it is initially noted that the area of a hexagonal cell=$3R^2 \sin 60°$ (or 2.6 $R^2$). For hexagonal cells, radius is considered the radius of a circle circumscribing the hexagonal cell. For square cells, the cell radius is considered the distance form the square center to a square corner. Furthermore, subscriber density, i.e., subscribers per a given area, can be represented as: δ $D_b$, and, thus, service bandwidth requirement for a given area can be represented as: $T1_b$ δ $D_b$, and total service bandwidth requirement for a hexagonal cell can be represented as: $2.6R^2 T1_b$ δ $D_b$ ($2R^2 T1_b$ δ $D_b$ for a square cell). Therefore, from equations (7) and (8):

$$2.6 \delta D_b R_{hub}^2 T1_b = \begin{cases} 0.54 B_{sec} N_{sec} S_{eff} & \text{for } T1 \text{ access} \\ 12.96 B_{sec} N_{sec} S_{eff} & \text{for } nxDS0 \text{ access} \end{cases} \quad (9)$$

Hence, $$R_{hub} = \begin{cases} \sqrt{\dfrac{0.54 B_{sec} N_{sec} S_{eff}}{2.6 \delta D_b T1_b}} & \text{for } T1 \text{ access} \\ \sqrt{\dfrac{12.96 B_{sec} N_{sec} S_{eff}}{2.6 \delta D_b T1_b}} & \text{for } nxDS0 \text{ access} \end{cases} \quad (10)$$

It follows that the maximum number of buildings which may be supported per Hub is given by:

$$B_{cell} = \begin{cases} \dfrac{0.54 B_{sec} N_{sec} S_{eff}}{T1_b} & \text{for } T1 \text{ access} \\ \dfrac{12.96 B_{sec} N_{sec} S_{eff}}{n} & \text{for } nxDS0 \text{ access} \end{cases} \quad (11)$$

where, $N_{sec}$: Number of sectors at a Hub, $T1_b$: Number of T1/ DS-1 trunks per building, n: Number of DS0 trunks per building, Although equation (11) gives the maximum number of buildings which may be adequately served by a Hub 20 with a given feeder capacity, cell size (and, thus, the number of buildings per cell) may be constrained by certain factors.

One known constraint on wireless network cell radius is the radio range of the Hub, which is function of the modulation technique utilized. For example, certain modulation techniques, such as QPSK (Quaternary Phase Shift Keying), have a greater radio range than other modulation techniques, such as QAM-64 (Quadrature Amplitude Modulation, 64 states). Table 1 illustrates exemplary radio range values, and spectral efficiencies, for various FDMA (frequency division multiple access) modulation schemes which may be utilized by the Hub radio transceiver.

TABLE I

FDMA Modulation Schemes and their Radio Ranges

| Name | Modulation Method | Spectral Efficiency | Radio Range (mi) |
|---|---|---|---|
| QPSK | Quaternary Phase Shift Keying | 1.2 bits/s/Hz | 6 |
| 4-QAM | Quadrature Amplitude Modulation, 4 states | 1.4 bits/s/Hz | 6 |
| 16-QAM | Quadrature Amplitude Modulation, 16 states | 3.5 bits/s/Hz | 3 |
| 64-QAM | Quadrature Amplitude Modulation, 64 states | 5 bits/s/Hz | 1.5 |

Such radio range values may vary in practice, and may be obtained through field testing. Furthermore, other modulation schemes may be employed in practice.

Another known constraint on wireless network cell size is the rain radius for cells in the network serving area. As discussed above, rainfall causes signal depolarization of the microwave frequencies allocated for broadband wireless networks, thereby decreasing signal levels and interference isolation between adjacent cell sectors Therefore, rain radius is known to be a function of the rain zone in which the serving area is located, characterized for example by the average rainfall per hour, and is also known to be a function of Hub transmit power, polarization sense, the antenna gain at the EUN, and rain availability, i.e., the acceptable outage time per caused by rain (e.g., a 99.99% rain availability corresponds to 53 minutes of outage time per year, and a 99.999% rain availability corresponds to 5.3 minutes of outage time per year). The radio range radius and rain radius are referred to herein as $R_{mod}$ and $R_{rain}$ respectively, and the minimum of $R_{mod}$ and $R_{rain}$, is referred to $R_{max}$. Because radio range and rain radius are well known constraints on cell size, calculations for obtaining $R_{mod}$ and $R_{rain}$ values are not detailed herein.

If Hub capacity can be fully utilized, i.e., without the cell size being constrained by either $R_{mod}$ or $R_{rain}$, cell radius can be based on the maximum number of buildings the Hub 20 is able to adequately serve. If either $R_{mod}$ or $R_{rain}$ constrains cell size, however, even though the Hub capacity is sufficient to accommodate buildings outside of $R_{max}$, additional cells must be created to satisfy the constraints on cell size imposed by $R_{max}$. In other words, if the cell size at which Hub capacity is fully utilized, R (assumed in the following discussion to equal $R_{hub}$), is greater than $R_{max}$, the number of buildings within the reduced radius $R_{max}$ is proportional to $R_{max}^2/R^2$. Thus, the maximum number of buildings supportable per cell in such an instance is given by:

$$B_{cell} = \begin{cases} \dfrac{0.54 B_{sec} N_{sec} S_{eff} R_{max}^2}{T1_b R^2} & \text{for } T1/DS1 \text{ access and } R > R_{max} \\ \dfrac{12.96 B_{sec} N_{sec} S_{eff} R_{max}^2}{n R^2} & \text{for } nxDS0 \text{ access and } R > R_{max} \end{cases} \quad (12)$$

If δ is the penetration rate achieved/anticipated by a network operator, then the subscriber density is:

$$D_{cap} = \delta D_b = \delta \frac{B_n}{A_{co}} \quad (13)$$

Hence, number of cells in the area served by the SN 10 is:

$$N_{cell} = \begin{cases} \dfrac{\delta B_n}{B_{cell}} & \text{for } R \leq R_{max} \\ \dfrac{R^2 \delta B_n}{R_{max}^2 B_{cell}} & \text{if } R > R_{max} \end{cases} \quad (14)$$

and cell area is $$A_{cell} = \begin{cases} A_{co}\dfrac{B_{cell}}{\delta B_n} = \dfrac{B_{cell}}{D_{cap}} = 2.6R^2 & \text{for } R \leq R_{max} \\ A_{co}\dfrac{R_{max}^2 B_{cell}}{R^2 \delta B_n} = \dfrac{R_{max}^2 B_{cell}}{R^2 D_{cap}} = 2.6R_{max}^2 & \text{if } R > R_{max} \end{cases} \quad (15)$$

Again, $A_{cell}$ for a Hexagonal cell=$3R^2 \sin 60°$; and $A_{cell} 2R^2$ for a square cell.

From equations (12) to (15), $$B_{cell} = \begin{cases} \dfrac{0.54 B_{sec} N_{sec} S_{eff}}{T1_b} = 2.6\delta D_b R^2 & \text{for } T1/DS1 \text{ access and } R \leq R_{max} \\ \dfrac{0.54 B_{sec} N_{sec} S_{eff} R_{max}^2}{T1_b R^2} = 2.6\delta D_b R_{max}^2 & \text{for } T1/DS1 \text{ access if } R > R_{max} \\ \dfrac{12.96 B_{sec} N_{sec} S_{eff}}{n} = 2.6\delta D_b R^2 & \text{for } nxDS0 \text{ access and } R \leq R_{max} \\ \dfrac{12.96 B_{sec} N_{sec} S_{eff} R_{max}^2}{n R^2} = 2.6\delta D_b R_{max}^2 & \text{for } nxDS0 \text{ access if } R > R_{max} \end{cases} \quad (16)$$

Therefore, from equations (4) and (16), the Hub cost function, $C_{fhub}$, becomes $$C_{fhub} = \dfrac{C_{mux} + C_{sr} N_{sec}}{2.6 R^2 \delta D_b} \quad (17)$$

where from (9) and (10), $$R = \begin{cases} \sqrt{\dfrac{0.54 B_{sec} N_{sec} S_{eff}}{2.6 \delta D_b T1_b}} & \text{for } T1 \text{ access and } R \leq R_{max} \\ \sqrt{\dfrac{12.96 B_{sec} N_{sec} S_{eff}}{2.6 \delta D_b n}} & \text{for } nxDS0 \text{ access and } R \leq R_{max} \\ R_{max} & \text{if } R > R_{max} \end{cases} \quad (18)$$

which implies that, for equations (17) and (18):

$$R = \begin{cases} R_{hub} & \text{for } T1, nxDS0 \text{ accesses and } R_{hub} \leq R_{max} \\ R_{max} & \text{if } R_{hub} > R_{max} \end{cases} \quad (19)$$

$$R_{hub} = \begin{cases} \sqrt{\dfrac{0.54 B_{sec} N_{sec} S_{eff}}{2.6 \delta D_b T1_b}} & \text{for } T1 \text{ access} \\ \sqrt{\dfrac{12.96 B_{sec} N_{sec} S_{eff}}{2.6 \delta D_b T1_b}} & \text{for } nxDS0 \text{ access} \end{cases} \quad (20)$$

and $R_{max} = \min(R_{rain}, R_{mod})$.

The Transport Loop Cost Model

The feeder cost per building, $C_{ff}$, for the feeder loop can be generally represented as:

$$C_{ff} = \dfrac{C_f}{N_{cell} B_{cell}} \quad (21)$$

where, $C_f = C_{fmile} f$ is the cost of the feeder loop and
f:length of leased/built-out fiber feeder cabel
$C_{fmile}$:cost/mile of leased/built-out fiber feeder cable
Therefore, $$C_{ff} = \dfrac{C_{fmile} f}{N_{cell} B_{cell}} \quad (22)$$

Figure 4A:
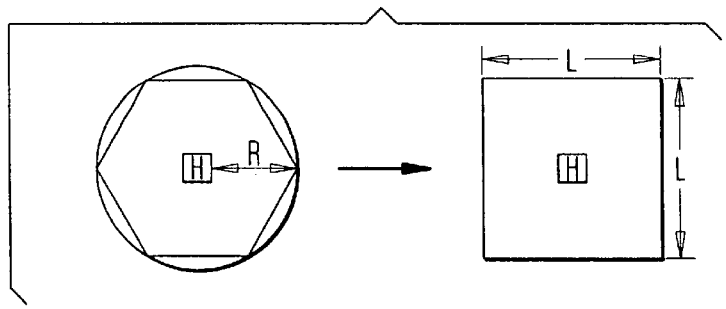
FIGS. 4A–4D illustrate a technique for modeling a feeder network according to an embodiment of the present invention.

Assuming hexagonal cells, such cells may initially be converted to squares to facilitate calculating feeder length. FIG. 4A illustrates such a step of transforming a hexagonal cell of radius R, where R is the radius of a circle circumscribing a hexagonal cell, into an equivalent square cell of side L. More specifically, cell radius is converted to length by calculating:

$$L = R\sqrt{2.6} \quad (23)$$

Figure 4B:
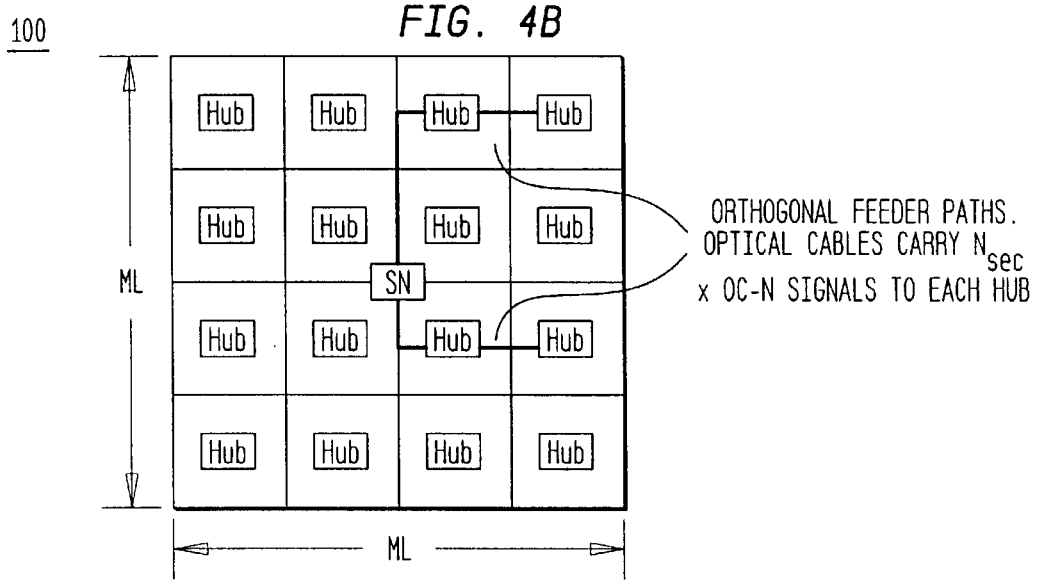

Referring to FIG. 4B, the area served by the SN 10 is then transformed into an equivalent square serving area having a number, $M^2$, of square cells, and is estimated from $M^2 = N_{cell}$. Thus, $$M \approx \sqrt{N_{cell}}, M \text{ being an integer.} \quad (24)$$

Figure 4C:
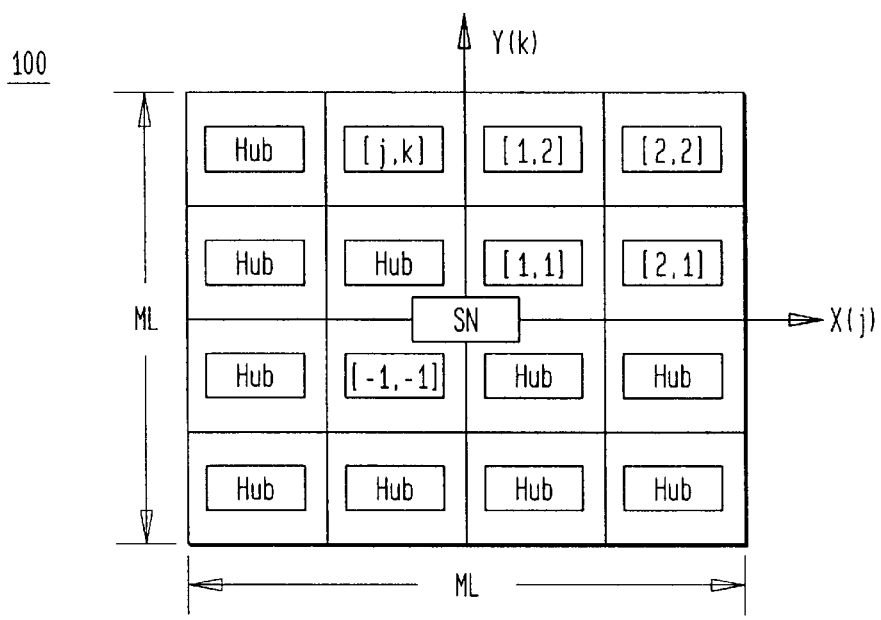

As shown in FIG. 4C, the fixed wireless access network 100 can further be represented as a Cartesian coordinate system centered on the SN 10, in which the locations of the Hubs are represented by integer coordinate pairs (j, k), where j=0,±1,±2, . . . and k=0,±1, ±2, . . . The Hubs are assumed to be connected to the SN 10 on a point-to-point topology. When the number of cells in the serving-area is even, as shown in FIG. 4C (i.e., M is even), the set of orthogonal cable lengths from the SN 10 to the Hub locations can be generated sequentially from the function:

$$F(j, k) = 2L[(1+2j) + (1+2k)] \quad (25)$$

For non-negative integer variable sets $$J = \left\{0 \leq j < \dfrac{M}{2}\right\} \text{ and } K = \left\{0 \leq k < \dfrac{M}{2}\right\}$$

Figure 4D:
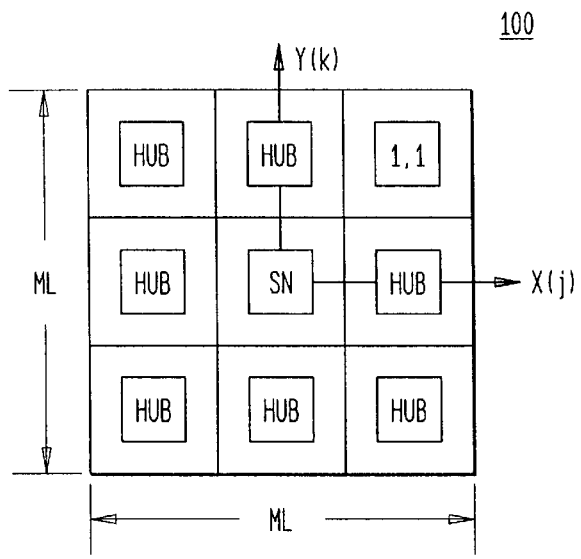

If the number of cells in the SN serving-area is odd, as shown in FIG. 4D (i.e. M is odd), the set of orthogonal cable lengths from the SN 10 to the Hub locations can be generated as a sequence of the function:

$$F(j, k) = 4L(i \, j + 2k). \quad (26)$$

For non-negative integer variable sets, $$J = \left\{0 \le j < \frac{M}{2}\right\} \text{ and } K = \left\{1 \le k < \frac{M}{2}\right\}$$

The total length of the feeder loop is computed from (25) and (26) as:

$$f = \begin{cases} L\dfrac{M^3}{2} & \text{for } M \text{ even} \\ L\dfrac{M(M^2-1)}{2} & \text{for } M \text{ odd} \end{cases} \quad (27)$$

The mean feeder length is given by:

$$\bar{f} = \begin{cases} \dfrac{ML}{2} & \text{for } M \text{ even} \\ \dfrac{L}{2}\left(M - \dfrac{1}{M}\right) & \text{for } M \text{ odd} \end{cases} \quad (28)$$

Note that if M is large, f and $\bar{f}$ for both the even and odd cases are equivalent. Hence from (14), (16), (22) and (27), the feeder loop cost function is, $$C_{ff} = \frac{C_{fmile}}{2} \begin{cases} \dfrac{\sqrt{A_{co}}}{2.6R^2 \delta D_b} & \text{for } N_{cell} \text{ even} \\ \dfrac{\sqrt{A_{co}}\left(1 - \dfrac{2.6R^2}{A_{co}}\right)}{2.6R^2 \delta D_b} & \text{for } N_{cell} \text{ odd} \end{cases} \quad (29)$$

where from equations (10) and (19)

$$R = \begin{cases} R_{hub} & \text{for } T1, nDS0 \text{ accesses and } R_{hub} \le R_{max} \\ R_{max} & \text{if } R_{hub} > R_{max} \end{cases} \quad (19)$$

where $$R_{hub} = \begin{cases} \sqrt{\dfrac{0.54 B_{sec} R_{sec} S_{eff}}{2.6 \delta D_b T1_b}} & \text{for } T1 \text{ access} \\ \sqrt{\dfrac{12.96 B_{sec} R_{sec} S_{eff}}{2.6 \delta D_b T1_b}} & \text{for } nDS0 \text{ access} \end{cases} \quad (10)$$

and $R_{max} = \min(R_{rain}, R_{mod})$.

Again, if M is large, $C_{ff}$ for both the even and odd cases are equivalent. As the above cost model illustrates, the cost of the feeder network can be expressed as a function of the cell radius. Therefore, the impact of factors which constrain cell radius, such a modulation technique, receiver antenna gain, rain availability, penetration rates, etc. on feeder cost may be realized.

The Service Node Cost Model

Figure 5:
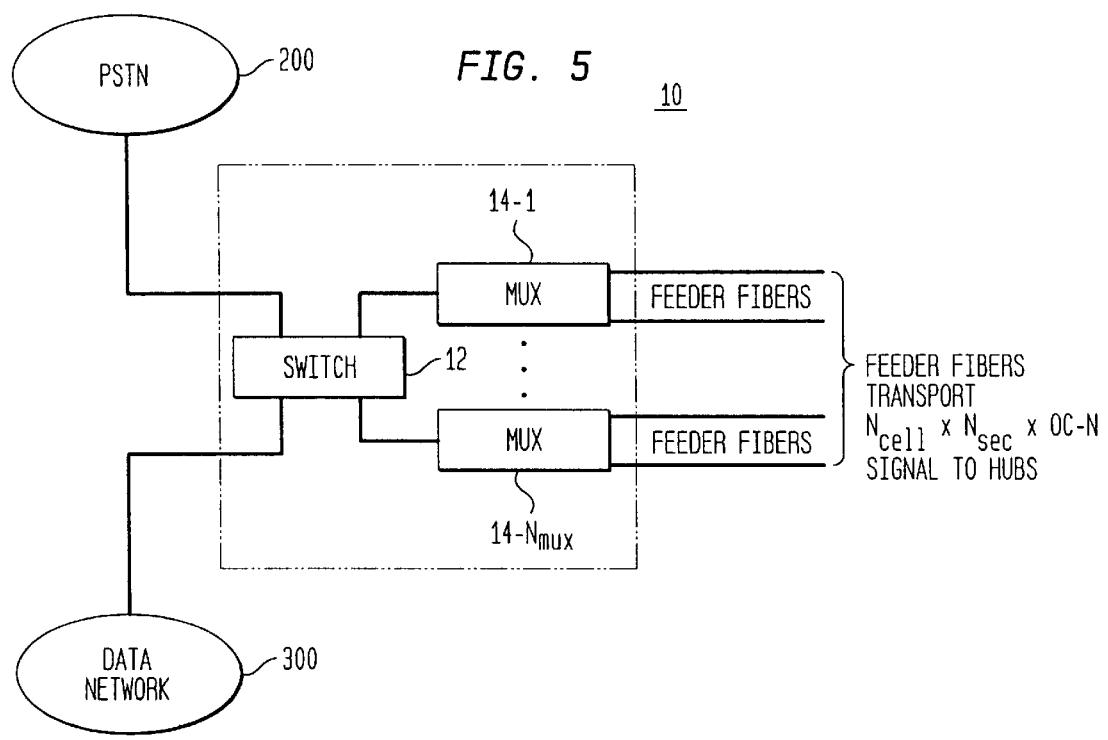
FIG. 5 illustrates an exemplary Service Node architecture which may be modeled in accordance with the present invention.

As illustrated in FIG. 5, the cost model of an exemplary SN 10 includes: (1) the cost of a switch 12, which routes voice traffic from/to the PSTN 200 and routes data traffic from/to the data network 300; and (2) the cost of a number of multiplexers 14-1, . . . , 14-N$_{mux}$ which are required to transport OC-N signals from the SN 10 to the Hubs 20-1, . . . , 20-N$_{cell}$. The bitrate transported by the SN 10 is N N$_{sec}$ N$_{cell}$×OC-1. Therefore, if the multiplexers 14-1, . . . , 14-N$_{mux}$ have a capacity of OC-N', the required number of OC-N multiplexers is N N$_{sec}$ N$_{cell}$/N'.

Accordingly, the cost of the SN 10 per building, $C_{fs}$, is:

$$C_{fs} = C_{sw} + \frac{N N_{sec} C_{mux}}{N' B_{cell}} \quad (30)$$

where,

| | | |
|---|---|---|
| $C_{sw}$ | :Cost of switching per building per T1$_b$ | (for T1/DS1 access) |
| | :Cost of switching per building per n | (for nxDS0 access) |
| N | =1, 3, 12, . . . in OC-N. | |

From (16) and (30), the SN cost function becomes:

$$C_{fs} = \left(C_{sw} + \frac{N N_{sec} C_{mux}}{2.6 R^2 \delta D_b N'}\right) \quad (31)$$

EUN Cost Model

The required number, T1$_b$, of T1/DS-1 or the number, n, of DS0 trunks to be provisioned to subscribers may be determined from service profiles which indicate the number of users per building, the grade of service required, etc. to estimate voice, fax, and data traffic levels. For example, a service bandwidth which is the equivalent of 4 T1/DS-1s trunks (i.e., 4×1.544 Mbps) may be needed to adequately satisfy a building's traffic and grade of service characteristics.

Figure 6:
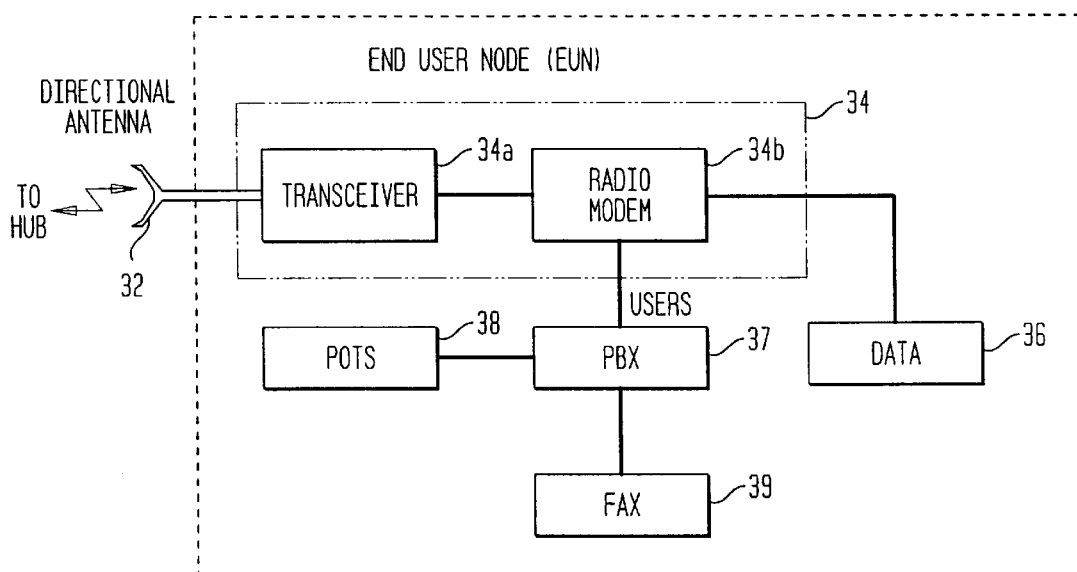
FIG. 6 illustrates an exemplary end user node architecture which may be cost-modeled in accordance with an embodiment of the present invention.

As shown in FIG. 6, the EUN cost includes at least the cost of a directional antenna 32 for transmitting/receiving to/from a Hub 20, and a reception/transmission unit 34 which includes a transceiver 34a and a radio modem 34b for provisioning service to EUN drop points, such as a data source 36 (e.g., a local area network), and a PBX (private branch exchange) 37 connected to a POTS (plain old telephone service) drop point 38 and a facsimile machine 39. Thus, the EUN cost per building, $C_{jb}$, may be represented as:

$$C_{jb} = \begin{cases} T1_b C_{T1} & \text{for } T1/DS1 \text{ access} \\ nC_n & \text{for } nxDS0 \text{ access} \end{cases} \quad (32)$$

where,

| | |
|---|---|
| T1$_b$ | :number of T1 or DS-1 trunks per building |
| n | :number of DS0s per building |
| $C_{T1}$ | :Cost of radio (transceiver + modem) per T1/DS1 bitrate |
| $C_n$ | :Cost of radio (transceiver + modem) per DS0 bitrate |

Total Cost Model

Substituting the EUN cost function, $C_{jb}$; the Hub cost function, $C_{jhub}$; the feeder cost function, $C_{ff}$; and the SN cost function, $C_{fs}$ from equations (17), (29), (31) and (32) into the end-to-end network cost function of equation (1) yields:

$$C_{fn} = \left(C_{sw} + \frac{N N_{sec} C_{mux}}{2.6 R^2 \delta D_b N'}\right) + \quad (33)$$

$$\frac{C_{fmile}}{2} \begin{cases} \dfrac{\sqrt{A_{co}}}{2.6R^2 \delta D_b} & \text{for } N_{cell} \text{ even} \\ \dfrac{\sqrt{A_{co}}\left(1 - \dfrac{2.6R^2}{A_{co}}\right)}{2.6R^2 \delta D_b} & \text{for } N_{cell} \text{ odd} \end{cases} +$$

-continued $$\left(\frac{C_{mux} + C_{sr}N_{sec}}{2.6R^2\delta D_b}\right) + \begin{cases} Tl_bC_{T1} & \text{for } T1/DS1 \text{ access} \\ nC_n & \text{for } nxDS0 \text{ access} \end{cases}$$

Since in most practical cases, the serving-area is much larger than the area of an individual cell area, i.e., $A_{co}$>>cell area $2.6R^2$, equation (33) becomes:

$$C_{fn} = \left(C_{sw} + \frac{N N_{sec} C_{mux}}{2.6R^2 \delta D_b N'}\right) + \frac{C_{fmile}\sqrt{A_{co}}}{5.2R^2 \delta D_b} + \quad (34)$$

$$\frac{C_{mux} + C_{sr}N_{sec}}{2.6R^2 \delta D_b} + \begin{cases} Tl_bC_{T1} & \text{for } T1/DS1 \text{ access} \\ nC_n & \text{for } nxDS0 \text{ access} \end{cases}$$

and $R = \begin{cases} R_{hub} & \text{for } T1, nxDS0 \text{ accesses and } R_{hub} \le R_{max} \\ R_{max} & \text{if } R_{hub} > R_{max} \end{cases}$ (19)

where $R_{hub} = \begin{cases} \sqrt{\dfrac{0.54 B_{sec} R_{sec} S_{eff}}{2.6\, \delta D_b Tl_b}} & \text{for } T1 \text{ access} \\ \sqrt{\dfrac{12.96 B_{sec} R_{sec} S_{eff}}{2.6\, \delta D_b Tl_b}} & \text{for } nxDS0 \text{ access} \end{cases}$ (10)

and $R_{max} = \min(R_{rain}, R_{mod})$.

Cost Sensitivity Analysis/Computer Implementation

In accordance with the node, link, and total network cost models specified above, cost-sensitivity analysis can be performed for given system values and input variables, such as Hub radio capacity ($H_{cap}$), bandwidth requirements per building ($Tl_b$), the number of sectors ($N_{sec}$), rain radius ($R_{rain}$), and radio range ($R_{mod}$) Therefore, the cost models disclosed herein yield a complete characterization of access network costs in terms of demographic parameters ($A_{co}$, $D_b$), a marketing parameter ($\delta$), a traffic parameter ($Tl_b$), and system parameters ($R$, $N_{sec}$, $C_{T1}$, $C_{fmile}$, $C_{mux}$, $C_{sw}$, etc.).

Table II illustrates exemplary network values and input values which may be substituted into equations (17), (29), (31), (32), and (33) to determine network node, link, and end-to-end costs. The cost values, $C_{sw}$, $C_{sr}$, $C_{mux}$, $C_{fmile}$, and $C_{T1x}$ in Table II are normalized cost values.

TABLE II

Network Variable and Symbols

| Network Variable | Symbol | Value |
| --- | --- | --- |
| Switch cost per building per $Tl_b$ or per n | $C_{sw}$ | 1 |
| Number of sectors per cell | $N_{sec}$ | variable |
| Bitrate per sector (OC-N) | N | 1 |
| Capacities of SN/Hub multiplexers (OC-N') | N' | 12 |
| Cost of radio (transceiver + antenna) per sector | $C_{st}$ | 6.61 |
| Cost of OC-12 multiplexer | $C_{mux}$ | 44.91 |
| Building density in SN area | $D_b$ | 15.5 buildings/sq.mile |
| Hub Cell radius | R | variable |
| Service penetration rate | $\delta$ | variable |
| Surface area of SN serving-area | $A_{co}$ | 1,000 sq. miles |
| Cost per mile of built-out fiber feeder network | $C_{fmile}$ | 6.61 |
| Cost of EUN/T1 or DS-1 | $C_{T1x}$ | =2.48/4 |
| Number of T1s or DS-1s per building | $Tl_b$ | 4 |
| Number of cells in the SN serving-area | $N_{cell}$ | variable |

In addition to setting the values and input variables shown in table II, a user may track the effect of various factors which impact cell radius R, such as modulation scheme, rain availability requirements, rain zone, EUN antenna gain, etc., on cell size, and node, link, and end-to-end cost.

Figure 7A:
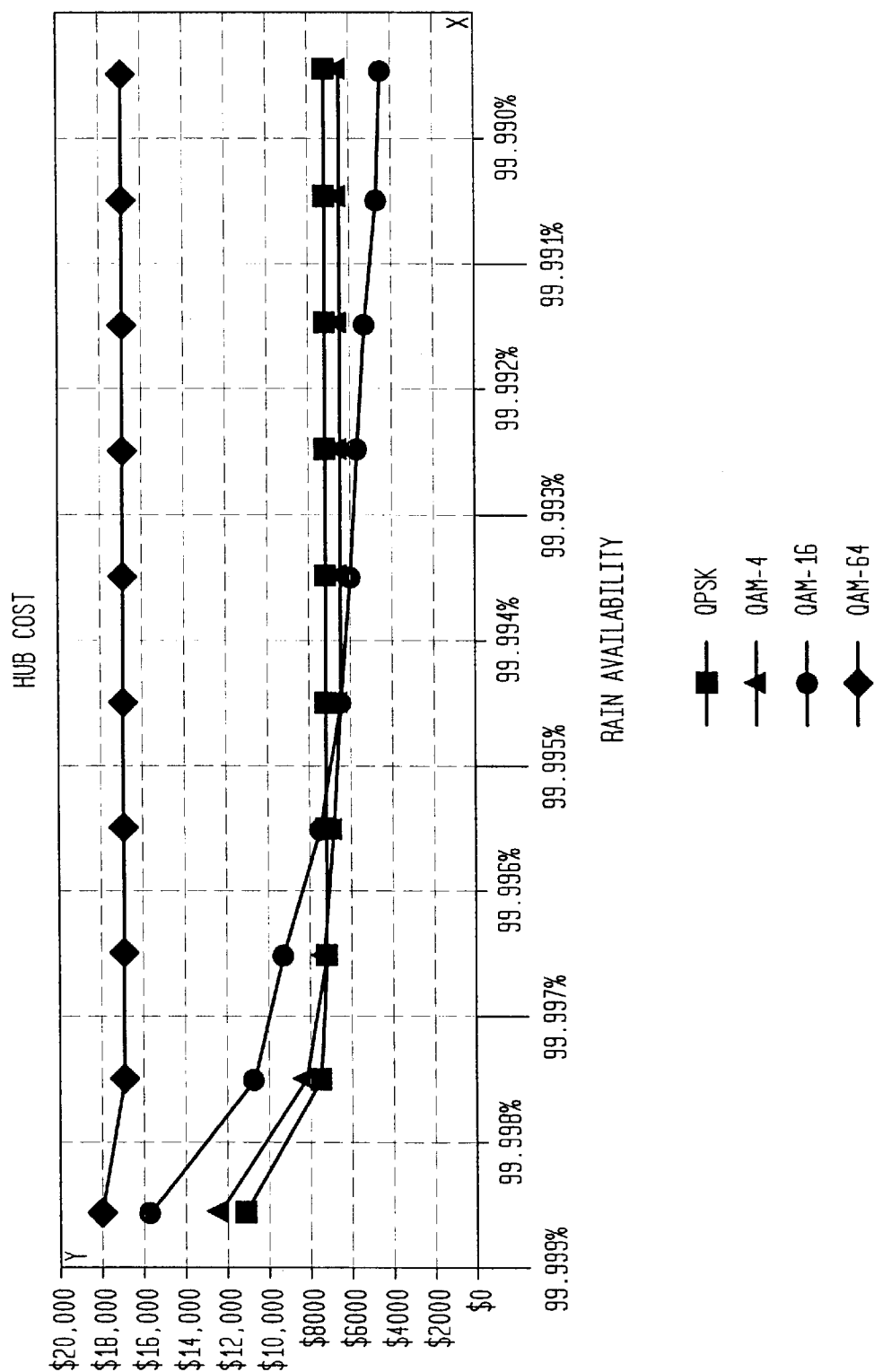

FIG. 7A illustrates an exemplary cost-sensitivity analysis plot which may be generated in accordance with the cost modeling technique detailed above for a specific set of network values and input variables. Specifically, FIG. 7A illustrates the impact of changing modulation techniques, QPSK, QAM4, QAM-16, and QAM-64, on hub cost per building (y-axis) for rain availability requirements ranging from 99.999% to 99.990% (x-axis). As discussed above, the radio range, or $R_{mod}$, is a function of the modulation technique employed, and $R_{rain}$ is a function of rain availability requirements. Furthermore, the modulation technique affects $R_{hub}$, because $R_{hub}$ is a function of spectral efficiency. FIG. 7A illustrates that, for a certain set of network values and input variables, the QPSK modulation scheme optimizes Hub cost at the highest rain availability requirements, but QAM-16 optimizes hub cost at lower rain availability requirements. Therefore, such a cost-sensitivity output can facilitate cost-efficient network design.

FIG. 7B illustrates another exemplary cost-sensitivity analysis plot which may be generated in accordance with the cost modeling technique detailed above. Specifically, FIG. 7B illustrates the impact of selecting a certain antenna type, such as an integral antenna, a 12-inch antenna, and a 24-inch antenna for use at the EUN (x-axis) on total network cost (y-axis) for a given set of network value/input variables and each of the modulation types listed above. Again, the radio range, or $R_{mod}$, and $R_{hub}$ are functions of the modulation technique employed, and $R_{rain}$ is a function of the antenna gain at the EUN. It can be seen from the exemplary cost-sensitivity plot illustrated in FIG. 7B that the use of a 24-inch antenna at the EUN and a QAM-16 modulation technique optimizes end-to-end cost for the set of network values and input variables therein. It can also be seen that if a QAM-4 or QSPK modulation technique is employed, end-to-end cost actually increases for larger antennas (due to the added expense of the extra antenna and no favorable impact on cell radius). It should be noted the cost sensitivity plots such as those illustrated in FIGS. 7A and 7B may plot the relationship between various network parameters, and will often greatly depend on the specific network values and input variables chosen.

Figure 8:
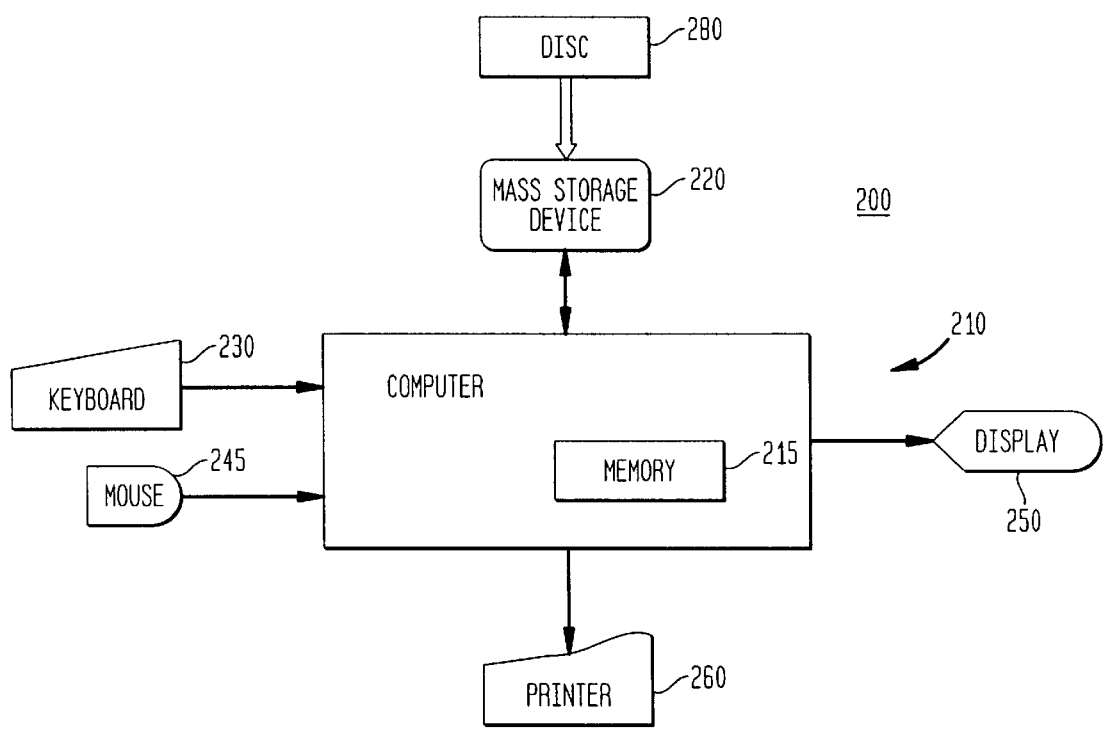
FIG. 8 is a block diagram of a computer system for implementing cost modeling in accordance with the present invention.

A computer system 200 for implementing the cost modeling and interactive cost-sensitivity analysis according to the present invention is shown in the block diagram of FIG. 8. The computer system 200 includes a computer 210 having memory 215. To allow user interaction with the computer 110, i.e., to select input variables and set network values used to model network costs, the computer system 200 includes a keyboard 230 and a mouse 245. For outputting modeling results, the computer system 200 also includes a display 250, such as a cathode ray tube or a flat panel display, and a printer 260. The computer system 200 also includes a mass storage device 220. The mass storage device 220 may be used to store a computer program, such as conventional spread-sheet software, which allows the cost modeling technique and cost-sensitivity analysis disclosed herein to be executed when loaded on the computer 210. As an alternative, the mass storage device 220 may be a network connection or off-line storage which supplies a program to the computer. More particularly, a program embodying the modeling technique of the present invention may be loaded from the mass storage device 220 into the internal memory 215 of the computer 210, the result being that the general purpose computer 210 is transformed into a special purpose machine which implements the cost modeling technique of the present invention. A computer-readable medium, such as the disc 280 in FIG. 8 may be used to load computer-readable code into the mass storage device 220.

It should be apparent to those skilled in the art that various other modifications and applications of this invention are contemplated which may be realized without departing from the spirit and scope of the present invention.

What is claimed is:

1. A method of modeling costs of a communications network, said network being designed to serve subscribers in a geographic area which is partitioned into a number of cells, said method comprising:

defining a set of input variables which impact cell size;

determining cell size based on at least one of said input variables by taking the minimum of three constraining radii: (1) a radio range radius; (2) a rain radius; and (3) a hub capacity radius; and modeling network implementation costs as a function of cell size.

2. The method of claim 1, wherein said modeling step models total network implementation cost as a number of additive components, including a cell hub cost component, a feeder network cost component, an end user cost component, and a service node cost component.

3. The method of claim 1, wherein the radio range radius is a function of the modulation technique utilized by a cellular base station;

the rain radius is a function of rain zone, rain availability requirements, and end node antenna gain; and the hub capacity radius is a function of modulation spectral efficiency, service bandwidth requirements, and subscriber density.

4. The method of claim 3, wherein the hub capacity radius is determined by calculating:

$$R_{hub} = \begin{cases} \sqrt{\dfrac{0.54 B_{sec} N_{sec} S_{\mathit{eff}}}{2.6\, \delta D_b T1_b}} & \text{for } T1 \text{ access} \\ \sqrt{\dfrac{12.96 B_{sec} N_{sec} S_{\mathit{eff}}}{2.6\, \delta D_b T1_b}} & \text{for } nxDS0 \text{ access} \end{cases}$$

where, $R_{hub}$ is hub radius, $N_{sec}$ is a number of hub sectors, $B_{sec}$ is bandwidth per sector, $S_{\mathit{eff}}$ is spectral efficiency, $\delta$ is subscriber penetration rate, $D_b$ is building density, and $T1_b$ is required bandwidth per building.

5. The method of claim 1, wherein said communication network is a fixed wireless access network.

6. The method of claim 1, wherein said cost variation output is a cost sensitivity plot.

7. The method of claim 6, wherein said at least one input variable includes the modulation technique which is utilized to transmit from a cellular base station to subscribers.

8. The method of claim 6, wherein said at least one input variable includes the antenna type utilized by a subscriber node to receive signals from a cellular base station.

9. The method of claim 6, wherein said at least one input variable includes rain availability requirements.

10. The method of claim 6, wherein said cost sensitivity plot indicates total network cost impact of at least one input variable which affects cell radius.

11. The method of claim 2, wherein said feeder network cost component is modeled as a function cell radius.

12. An apparatus for modeling costs of a communications network, said network being designed to serve subscribers in a geographic area which is partitioned into a number of cells, said apparatus comprising:

input means for defining a set of input variables which impact cell size;

calculating means for determining cell size based on at least one of the input variables by taking the minimum of three constraining radii: (1) a radio range radius; (2) a rain radius; and (3) a hub capacity radius; and modeling means for modeling network implementation costs as a function of cell size.

13. The apparatus of claim 12, wherein said modeling means models total network implementation cost as a number of additive components, including a cell hub cost component, a feeder network cost component, an end user cost component, and a service node cost component.

14. The apparatus of claim 12, wherein the radio range radius is a function of the modulation technique utilized by a cellular base station;

the rain radius is a function of rain zone, rain availability requirements, and end node antenna gain; and the hub capacity radius is a function of modulation spectral efficiency, service bandwidth requirements, and subscriber density.

15. The apparatus of claim 12, wherein the hub capacity radius is determined by calculating:

$$R_{hub} = \begin{cases} \sqrt{\dfrac{0.54 B_{sec} N_{sec} S_{\mathit{eff}}}{2.6\, \delta D_b T1_b}} & \text{for } T1 \text{ access} \\ \sqrt{\dfrac{12.96 B_{sec} N_{sec} S_{\mathit{eff}}}{2.6\, \delta D_b T1_b}} & \text{for } nxDS0 \text{ access} \end{cases}$$

where, $R_{hub}$ is hub radius, $N_{sec}$ is a number of hub sectors, $B_{sec}$ is bandwidth per sector, $S_{\mathit{eff}}$ is spectral efficiency, $\delta$ is subscriber penetration rate, $D_b$ is building density, and $T1_b$ is required bandwidth per building.

16. The apparatus of claim 12, wherein said communication network is a fixed wireless access network.

17. The apparatus of claim 12, wherein said cost variation output is a cost sensitivity plot.

18. The apparatus of claim 17, wherein said at least one input variable includes the modulation technique which is utilized to transmit from a cellular base station to subscribers.

19. The apparatus of claim 17, wherein said at least one input variable includes the antenna type utilized by a subscriber node to receive signals from a cellular base station.

20. The apparatus of claim 17, wherein said at least one input variable includes rain availability requirements.

21. The apparatus of claim 17, wherein said cost sensitivity plot indicates total network cost impact of at least one input variable which affects cell radius.

22. The apparatus of claim 13, wherein said feeder network cost component is modeled as a function cell radius.

23. A computer readable medium storing program code for modeling costs of a communications network, said network being designed to serve subscribers in a geographic area which is partitioned into a number of cells, wherein, when the stored program is executed on a computer, the computer executes an operation comprising:

defining a set of input variables which impact cell size;

determining cell size based on at least one of the input variables by taking the minimum of three constraining radii: (1) a radio range radius; (2) a rain radius; and (3) a hub capacity radius; and modeling network implementation costs as a function of cell size.

* * * * *